United States Patent [19]

Pretsch

[11] 4,263,993
[45] Apr. 28, 1981

[54] SAFETY PEDAL FOR POWER-DRIVEN VEHICLES

[76] Inventor: Norbert Pretsch, Stephanstrasse 1, 8871 Kammeltal-Behlingen, Fed. Rep. of Germany

[21] Appl. No.: 937,550

[22] Filed: Aug. 28, 1978

[30] Foreign Application Priority Data

Sep. 21, 1977 [DE] Fed. Rep. of Germany ....... 2742381

[51] Int. Cl.³ .......................... B60K 41/20; G05G 1/14
[52] U.S. Cl. .................................... 192/3 S; 74/478.5
[58] Field of Search ............... 192/3 S; 74/562, 562.5, 74/513, 478, 478.5

[56] References Cited

U.S. PATENT DOCUMENTS

| 2,164,921 | 7/1939 | Hoff | 192/3 S |
| 2,725,962 | 12/1955 | Dillingham | 192/3 S |
| 3,630,326 | 12/1971 | Kawaguchi | 192/3 S |
| 4,135,609 | 1/1979 | La Chiusa | 192/3 S |

*Primary Examiner*—George H. Krizmanich
*Attorney, Agent, or Firm*—Max Fogiel

[57] ABSTRACT

A safety pedal for powered vehicles in which an accelerator pedal acts in opposite direction to the brake mechanism. The accelerator pedal is located to one side adjacent to the brake pedal and is connected with the accelerator mechanism by a pivoted yoke mounted on the brake pedal. On one side of the pivot axis is a feeler arm which contacts the accelerator pedal. An actuating member extends on the other side of the pivot axis and is connected to the accelerator mechanism.

8 Claims, 4 Drawing Figures

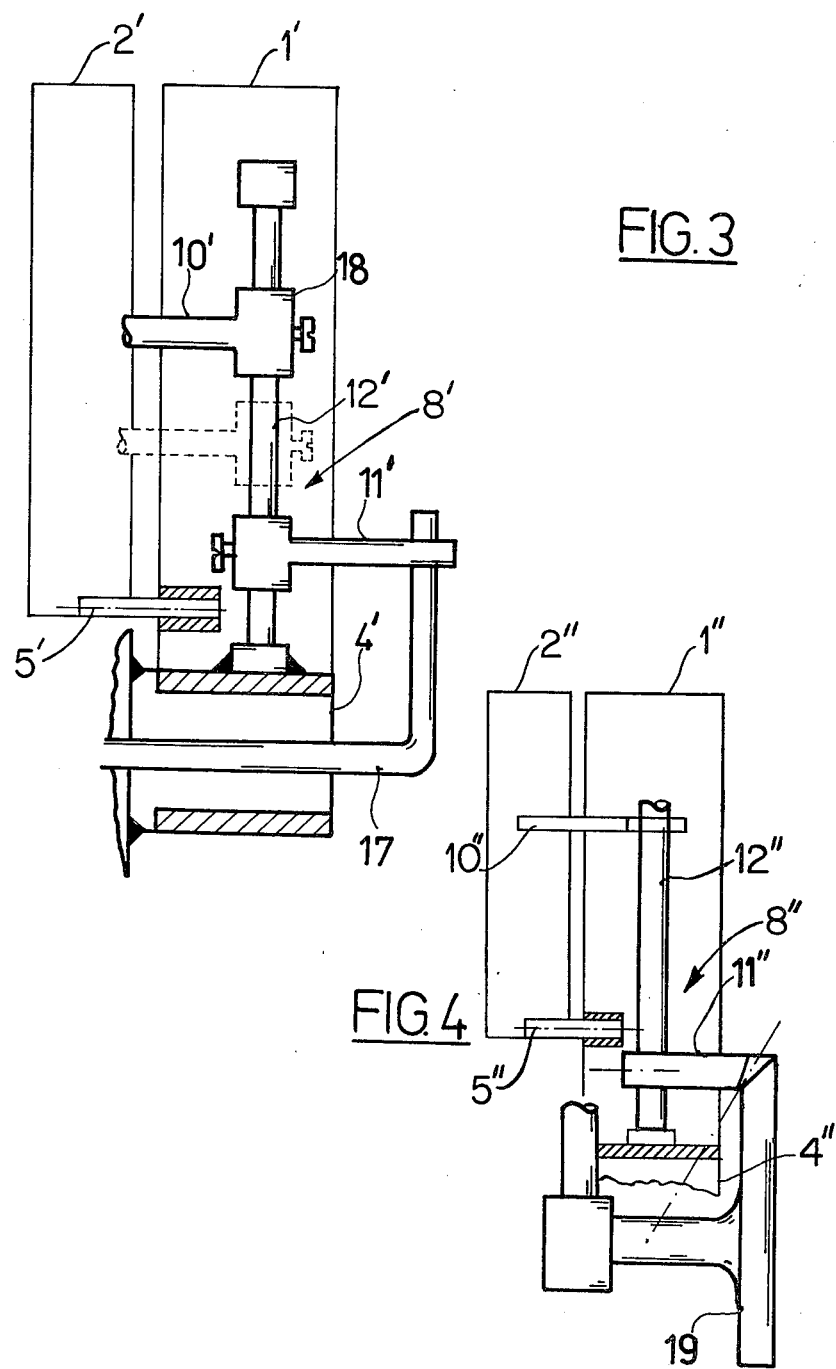

SAFETY PEDAL FOR POWER-DRIVEN VEHICLES

The invention concerns a safety pedal for power-driven vehicles with a brake pedal associated with the brake actuating mechanism and, mounted upon this brake pedal, an accelerator pedal associated with the acceleration mechanism.

Arrangements of this nature advantageously effect an automatic withdrawal of power when braking so that changeover and reaction times are appreciably reduced which is highly desirable for safety reasons.

In known arrangements which for example can be taken from German Pat. Nos. DT-PS 807 464 or DT-AS 1 066 435, 1 294 828 and 1 176 496, this has almost exclusively been sought to be achieved by means of a combined rocking pedal which is connected on one side with an accelerator cable and whose other side is mounted on a lever of the brake linkage. With the brake lever in its rest position, the accelerator is actuated by tilting the rocking pedal on its axis which is located upon the brake lever. This is effected by means of the foot with the leg more or less bent. The brake is actuated by pressing down the rocking pedal and at the same time, the fact that the braking and acceleration mechanisms are actuated in contrary directions causes power to be withdrawn.

Arrangements of this nature have shown themselves to be extremely disadvantageous because the foot of the driver of the vehicle that is applied to the combined rocking pedal that has been described, cannot be rested on the floor of the vehicle but has to be placed on the mentioned rocking pedal which leads to an extremely uncomfortable and arduous elevated leg positon so that rapid fatigue is to be expected. With known arrangements, particularly in the field of full acceleration, extremely unsatisfactory leg and foot postures can arise which can prove a considerable impediment to the driver.

Since the rocking pedal in the full acceleration position normally assumes a relatively flat position, there is also an increased danger of slipping off if the brake has suddenly to be applied from the full acceleration position. The possible consequences to road safety that might arise as a result are incalculable.

If on completion of a successful braking operation the original accelerator position is maintained, then, under certain circumstances, on releasing the brake, full acceleration could be reapplied immediately which would cause an unexpected acceleration which could similarly prove extremely dangerous to traffic. On the other hand, it is still necessary to find the original accelerator setting if the driver on releasing the brake should remove his foot completely from the described rocking pedal, quite apart from the fact that known arrangements require a not inconsiderable space for installation since, in such arrangements, the working areas of the braking and acceleration mechanisms are spacially additive. At the same time, with such arrangements, there is also an increased danger of blocking because of the relative ease with which objects can find their way behind the rocking pedal.

In the light of this, it is the object of the present invention to effect an arrangement of the type described at the outset while avoiding the disadvantages of the known solutions and which is not only of simple and space-saving construction but which, at the same time, permits of an extremely comfortable foot and leg posture while also ensuring safe and positive pedal actuation.

The problem is solved according to the invention in a surprisingly simple manner in that the accelerator pedal mounted upon the brake pedal is located in a normal manner to one side of the brake pedal, being connected to the acceleration mechanism by means of a pivoted yoke which is similarly carried upon the brake pedal. This pivoted yoke has its turning axis approximately vertical to the pedal axis with a feeler arm on one side in contact with the accelerator pedal and, more or less opposite to this on the other side, an actuating arm connected to the accelerator mechanism.

A pedal arrangement of this nature can be advantageously operated without difficulty with the foot resting on the floor of the vehicle, which clearly permits a comfortable and relaxed foot and leg posture whereby fatigue of the vehicle driver is effectively obviated. In addition, the joined arrangement of the brake and accelerator pedals in accordance with the invention permits of a clean and space-saving construction. The pivoted yoke in accordance with the invention is a component of extreme simplicity that, nevertheless, ensures an exact counteraction of the braking and acceleration operations.

By appropriately designing the feeler arm and thereby appropriately selecting the point at which this arm contacts the accelerator pedal, it is thus possible, in a simple manner, to achieve almost any desired degree of leverage.

A further advantage of the measures covered by the invention is to be seen in the fact that the arrangement of the pivoted yoke parallel to the pedal axis permits of exceptionally good acceleration control even when close to the braking position so that, when a braking operation is completed, immediate re-acceleration is possible which, in many situations, is highly desirable.

A particularly simple version of this invention could be making the pivoted yoke in the form of a rocker arm. A mechanical component of this type can be advantageously made in a simple manner while still being both strong and precise.

As a further development of the invention, the actuating arm coupled to the acceleration mechanism can be designed as a gear segment. An arrangement of this nature permits a particularly exact transmission of the turning movement developed by the pivoted yoke.

A further particularly practical measure can be that the pivoted yoke has its pivot extending at least in part over the length of the brake pedal, on which pivot at least the feeler arm that is in contact with the accelerator pedal is fitted in such a manner as to be adjustable. These measures advantageously ensure a simple and sensitive means of adjustment of the entire accelerator actuation by appropriately altering the location of the feeler arm and thus of the point of contact between the feeler arm and the accelerator pedal relative to the axis of the accelerator pedal.

In a further advantageous refinement of the invention, the feeler arm can be fitted with a roller at the accelerator pedal end. This measure advantageously provides a particularly low resistance and thus advantageously permits sensitive acceleration control.

Further features and advantages of the invention are to be gathered from the following description of some design examples as shown in the drawing in conjunction with the claims.

Whereby:

FIG. 3 shows a partial view of a further design version with an adjustable feeler arm in a similar representation to FIG. 1

FIG. 4 shows a partial view of a further design example with an actuating member designed as a gear segment.

Figure 1:
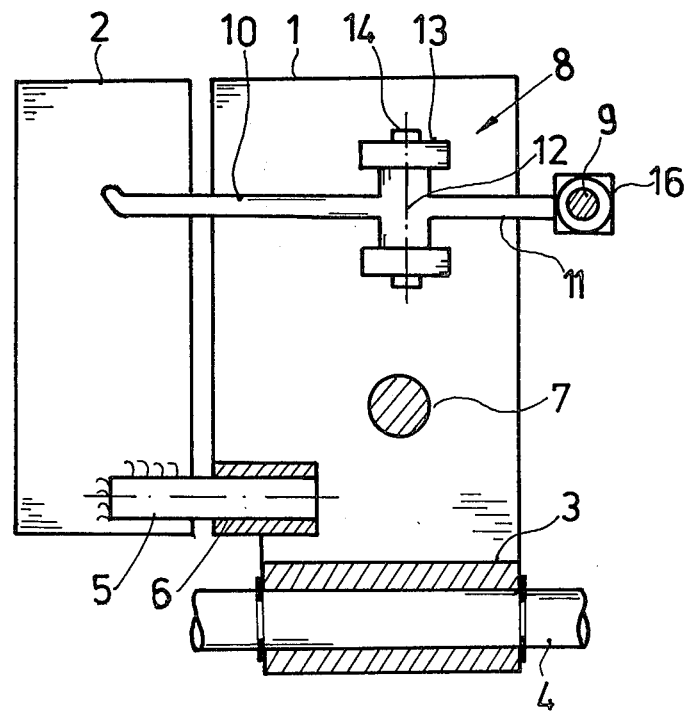
FIG. 1 shows a schematic representation of one of the first design versions of the invention viewed from below
Figure 2:
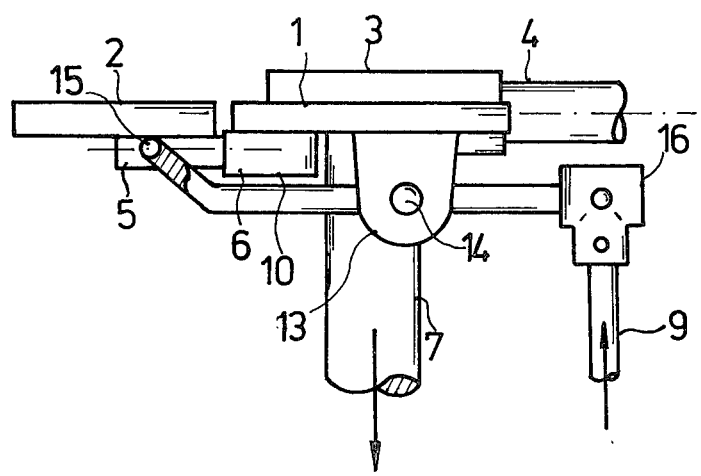
FIG. 2 shows an end-on view of the arrangement in FIG. 1

The pedal arrangement in FIGS. 1 and 2 comprises a brake pedal 1 and an adjacent accelerator pedal 2 as in conventional powered vehicles. In the examples given, for reasons of simplicity, the pedals 1 and 2 are shown plate shaped.

When accelerator 2, 2', or 2" is depressed, the brake pedal will remain in rest position. The gas-activating device in the form of control rod 9, bell crank 17, or gear quadrant (segment) 19 will then be shifted in the "gas-supply" direction. The axis 12, 12', or 12" of pivoted yoke 8, 8', or 8" is mounted so as to turn freely on the brake pedal. This pivoted yoke causes a shift in the activating directions of the accelerator and of the gas-supply apparatus that is associated with it. Accelerator 2, 2', 2" is fastened so as to rotate on brake pedal 1, 1', or 1" by pin 5, 5', or 5".

In the "gas-supply" state, the accelerator is rotated out of the plane of projection of FIGS. 1, 3, and 4. The directional rotation instituted by pivoted yoke 8, 8', or 8" produces a rotation or shift of the gas-activating device in the form of control rod 9, bell crank 17, or gear segment 19 in the opposite direction.

On the other hand, the activating directions of accelerator 2, 2', or 2" and of associated brake pedal 1, 1', or 1" will still correspond. In other words, the brake pedal will also be rotated out of the plane of projection of FIGS. 1, 3, and 4 during braking, just like the accelerator during gas supply. The directional rotation initiated by pivoted yoke 8, 8', or 8" will produce a shift in the activating direction of the brake linkage, represented in FIGS. 1 and 2 by slide 7, that is opposite to the activating direction of the gas-activating device formed of control rod 9, bell crank 17, or gear segment 19. The opposing arrows in the neighborhood of control rod 9 or slide 7 in FIG. 2, represent this situation. The direction of the arrow will thus represent here the activating direction during gas supply or braking.

When brake pedal 1, 1', or 1" is activated, it swings around axle 4, 4', or 4" out of the plane of projection of FIGS. 1, 3, and 4. Pivoted yoke 8, 8', or 8", is mounted on the brake pedal and will of necessity move along with it, and in fact in a direction opposite to the activating direction of the gas-activating rod or, in other words, in the "deceleration" direction. The result will be that the rocking sensor will be in a practically zero position. The gas supply will therefore be diminished independently in fact of the momentary position of the accelerator. This is most evident in FIG. 2. When brake pedal 1 is depressed it will carry with it not only accelerator 2, but also pivoting yoke 8, in the direction of the arrow shown at slide 7, in fact. This will also automatically bring about a shift of control rod 9 against the direction of the arrow shown there, and thus in the "gas-off" direction.

In the embodiment shown in FIGS. 3 and 4, the same is true in principle. When brake pedal 1 is depressed, pivoted yoke 8' runs through the same distance and control arm 11' allows bell crank 17 to be returned in the "gas-off" direction. When accelerator 2" is depressed, gear quadrant 11' turns counter-clockwise as viewed from above. Gear segment 19, which is linked to the gas-activating device, also turns clockwise as seen from the side. As soon as brake pedal 1" is depressed, gear segment 19 will be carried along counterclockwise by brake pedal 1" and therefore in the "gas-off" direction. The accelerator pedal 2 could be secured by means of a hinge fitted in the area of the abutment gap between the accelerator pedal 2 and the brake pedal 1. In the arrangement example shown, a pin 5 parallel to the pedal shaft 4 of the brake pedal 1 is used which could possibly be secured at its accelerator pedal end and have its brake pedal end engaged in a suitable bushing 6. This measure advantageously ensures a similar direction of operation over the entire pedal combination which further simplifies operation from a single comfortable foot position. With this in mind it is preferable that the pin 5 that forms the axis of the accelerator pedal 2 should be relatively close to the pedal axis 4 of the brake pedal.

For reasons of simplicity, the brake pedal 1 is shown in the design example represented as being provided with a pushrod identified by the number 7 which is connected with the brake linkage in a manner not shown in greater detail. The accelerator pedal 2 that is mounted on the brake pedal 1 is here shown coupled with an accelerator actuating mechanism, here indicated by a control rod 9, by means of a two-armed pivoted yoke which is similarly mounted on the brake pedal 1 and which is designated as a whole with the number 8.

When the brake pedal 1 is actuated, there is thus automatically an appropriate zero setting of the entire accelerator mechanism. The pivoted yoke 8 has the effect of causing the braking and acceleration mechanisms to be actuated in opposite directions so that when the brake mechanism is actuated, a zero setting of the accelerator mechanism is easily reached outside of the normal range of the pedal 2, from which acceleration is no longer possible, i.e. the acceleration control will be rendered inactive in any case, irrespective of the position of the accelerator pedal and vice-versa.

In the design example represented, the pivoted yoke, identified as a whole with the FIG. 8, is simply shown as an approximately horizontally arranged rocking lever whose extension on the accelerator pedal side forms a feeler arm 10 working in conjunction with the accelerator pedal 2 and whose extension on the opposite side to that forms an actuating arm 11 that constitutes an accelerator actuating mechanism in conjunction with the accelerator actuating rod 9. Here, the pivoted yoke 8 exhibits a pivot 12 arranged approximately at right angles to the pedal axis 4 and forming a single unit with the feeler arm 10 and the actuating arm 11.

As a means of securing the pivot 12, it is possible to provide bearing lugs 13 on the brake pedal 1, as is shown in bore in a central bushing of the pivoted yoke 8.

The distance from the rocking lever bearing the feeler arm 10 and the actuating arm 11 from the pedal shaft 4 should preferably be so chosen that the range of movement possible for the accelerator pedal 2 will be converted to an adequate movement of the actuating rod 9. Through the selection of various lengths of lever, further variation possibilities are provided hereby.

Another possibility for achieving the required transmission ratio relationship could be achieved somewhat in the manner of curving the feeler arm 10 upwards or downwards to alter the point of contact in respect of the accelerator pedal 2.

It is often sufficient if the feeler arm 10 with a suitable elbow lies against the accelerator pedal 2. In the design example represented, the feeler arm 10 is provided at its accelerator pedal end with a feeler roller 15, here preferably in the form of a ball secured in a suitable seating, whereby the sliding resistance when the accelerator pedal 2 is operated, can be kept particularly low. As a means of interconnection between the actuating member 11 and the accelerator actuating rod 9, something in the nature of a suitable swivel connection can be provided. It is often, however, sufficient to make the connection by means of a simple angled bushing as indicated in FIGS. 1 and 2 with the number 16.

The basic construction in the design examples represented in FIGS. 3 and 4 conforms to the previously described design examples and so it is convenient to use similar reference numbers for similar components whereby, for reasons of simplicity, only those features that differ from the previously described design forms are particularly detailed in the drawings.

In the design example represented in FIG. 3, the pivot 12' is rod-shaped, whereby a rod extending equal to the entire length of the brake pedal 1' can be provided. With this arrangement it is possible to locate the feeler arm 10' and the actuating arm 11' at differing heights which can be of particular advantage when it is necessary to locate the actuating member 11' relatively close to the pedal axis but still to provide a relatively large regulating movement.

In the design example represented, the actuating member 11', for example, actuates the accelerator mechanism in conjunction with a bell crank 17 which passes through the pedal shaft 4'. This proves to be necessary when, by means of a common sliding carriage, pedals are made to be adjustable relative to the body of the vehicle while retaining the accelerator and brake settings.

In the design example represented, both the feeler arm 10' and also the actuating member 11' are each made to be adjustable on the pivot shaft 12'. As a result it is possible to achieve a number of variation possibilities in respect of the leverage ratio. It is often, however, sufficient if only the feeler arm 10' can be adjusted in height. In such cases, the actuating member 11' can be made integral with the pivot shaft 12'.

In the design example represented in FIG. 4, an actuating member 11' in the form of a gear segment is provided that acts in conjunction with a suitable gear segment 19 that is not here shown in greater detail. With an arrangement of this sort it is possible to transmit, in an advantageous manner, even relatively high adjusting forces.

Some particularly favored design examples of the invention have been explained in detail above without, however, thereby implying any limitation. It is far more the case that a whole range of possibilities are available to the expert for him to adapt the general idea of the invention to the circumstances of individual applications.

For example, double levers could of course be provided in place of simple levers.

In certain cases, a suspended pendular arrangement in place of the standing arrangement indicated could prove to be suitable.

I claim:

1. A safety pedal for powered vehicles with a brake pedal associated with a brake mechanism and mounted upon this brake pedal, said brake pedal having a pedal shaft, an accelerator pedal associated with an accelerator mechanism and acting in opposite direction to the brake mechanism, a pivoted yoke mounted on the brake pedal and having a pivot axis substantially perpendicular to the pedal shaft, said accelerator pedal being located to one side adjacent to said brake pedal and being connected with the accelerator mechanism by means of said pivoted yoke mounted on the brake pedal, a feeler arm on one side of said pivot axis in contact with the accelerator pedal, and an actuating member extending on the other side of said pivot axis substantially opposite to said feeler arm and connected to the accelerator operating mechanism.

2. A safety pedal in accordance with claim 1, wherein said pivoted yoke comprises a two-armed rocking lever.

3. A safety pedal in accordance with claim 1, wherein said actuating member connected to the accelerator mechanism comprises a gear segment.

4. A safety pedal in accordance with claim 1 wherein said pivoted yoke has a pivot shaft extending at least over part of the height of the brake pedal, said feeler arm operating in connection with the accelerator pedal and being secured adjustably on said brake pedal.

5. A safety pedal in accordance with claim 1, wherein pedal shafts of the brake and the accelerator pedal extend parallel to one another.

6. A safety pedal in accordance with claim 1, wherein the pedal shaft of the brake pedal and accelerator pedal are placed adjacent to one other with substantially little distance between them.

7. A safety pedal in accordance with claim 1, wherein said feeler arm has a feeler roller in contact with said accelerator pedal.

8. A safety pedal as defined in claim 1, wherein said pivoted yoke comprises a two-armed rocking lever, said actuating member being connected to the accelerator mechanism comprises a gear segment, said pivoted yoke having a pivot shaft extending at least over part of the height of the brake pedal, said feeler arm operating in connection with the accelerator pedal and being secured adjustably on said brake pedal, shafts of the brake pedal and the accelerator pedal extending parallel to one another, shafts of the brake pedal and accelerator pedal being placed adjacent to one another with substantially little distance between them, said feeler arm having a feeler roller in contact with said accelerator pedal.

* * * * *